Dec. 18, 1956 C. M. JORDAN, JR 2,774,188
CHIPPING ATTACHMENT FOR LENS CUTTING MACHINE
Filed July 29, 1955
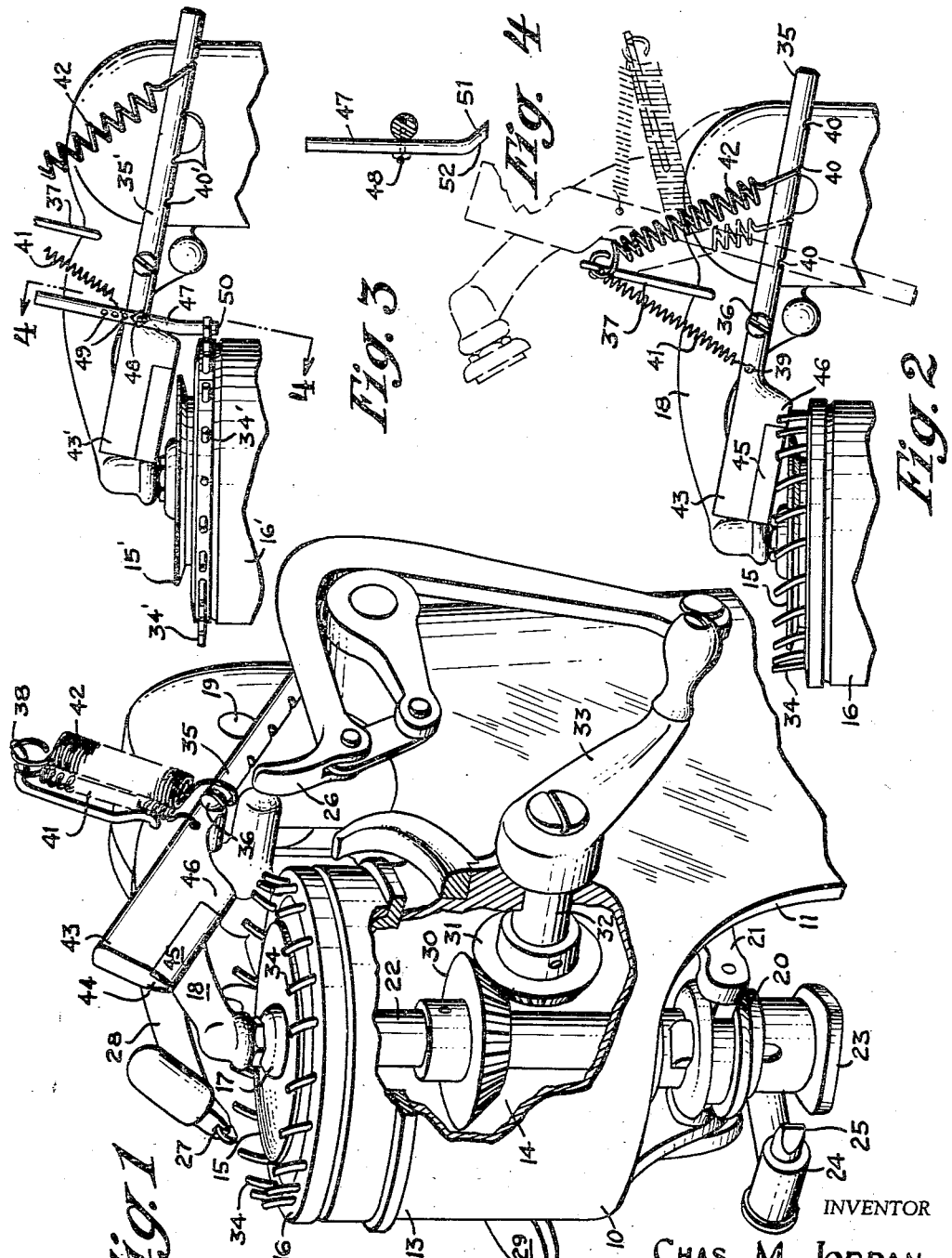
INVENTOR
CHAS. M. JORDAN
BY *Kimmel & Crowell*
ATTORNEYS //td># United States Patent Office 2,774,188
Patented Dec. 18, 1956

2,774,188

CHIPPING ATTACHMENT FOR LENS CUTTING MACHINE

Charles M. Jordan, Jr., Clinton, N. C.

Application July 29, 1955, Serial No. 525,237

5 Claims. (Cl. 49—48)

The present invention relates to chipping attachments for lens cutting machines, and more particularly to a device for clipping the edge portions from a lens, upon which a line has been cut, without removing the lens from the cutting machine.

The primary object of the invention is to provide an attachment for a lens cutting machine which will gently tap that portion of the lens lying outside of a cut severing line engraved on the glass by means of a cutter in the lens cutting machine.

This invention is shown and described as an attachment for the specific lens cutting machine shown and described in the patent to Lockhart, No. 1,997,561, issued April 9, 1935. It should be understood, however, that this invention can be attached to other lens cutting machines. In the Lockhart machine the lens is clamped between rotating members which are then rotated to score the lens by means of an adjustable cutter applied to the lens and varied according to a pattern. After the score line is applied to the lens, the lens is removed from the machine and that portion of the glass lying outside of the score line is removed by means of chipping pliers. In the event that the operator of the lens cutting machine is a novice, he may readily break the lens at some point within the score line when he attempts to chip the unwanted glass away. The present invention has, therefore, as its object the provision of a structure which can be attached to a lens cutting machine for tapping the lens about its periphery a substantial number of times so that the lens will have the outer unwanted edge thereof broken away.

Other objects and advantages will become apparent in the following specification when considered in the light of the attached drawings, in which:

Figure 1 is a perspective view of the invention, showing the chipping hammer in retracted position and a portion of the casing broken away for purposes of clarity;

Figure 2 is a side elevation of the invention showing the chipping hammer in operating position, and in dotted lines the retracted position thereof;

Figure 3 is a side elevation of a modified form of the invention, and

Figure 4 is a cross section taken on the line 4—4 of Figure 3.

Referring now to the drawings in detail wherein like reference numerals indicate like parts throughout the several figures, the reference numeral 10 indicates a hollow upright frame which is preferably open at the bottom and open, as at 11, toward the front. The frame 10 is provided at the rear portion thereof with an upwardly projecting bifurcated bracket 12 for receiving elements to be later described. The upper front portion of the frame 10 is provided with a hollow, substantially cylindrical, upright gear case 13 having an inner chamber 14.

A lens 15 is supported on a circular rotary table 16 and clamped thereto by means of a swivelly-mounted rotatable clamping head 17 which is carried by the front end of an arm 18 pivotally secured by means of pivot 19 in the bifurcated bracket 12. A lower clamping element (not shown) is mounted in the manner as disclosed in the Lockhart patent and is operated by means of a collar 20 and yoke 21. A shaft 22 extends centrally of the frame 10 and is operatively connected to the clamping table 16. The lower end of the shaft 22 carries the collar 20 and a pattern 23 at the lowermost end thereof. A follower 24 is pivoted to the frame 10 and has a bearing pin 25 adjustably secured therein for engagement with the pattern 23. A lever 26 is operatively associated with the arm 18 so that the arm 18 can be brought into clamping engagement with the lens 15 thereby.

An adjustable cutter 27 is carried by an arm 28 and is adapted to be brought into engagement with the lens 15 by pressure exerted on the lever 29. The shaft 22 carries the bevelled gear 30 and a second bevelled gear 31 is carried by a stub shaft 32 with the gear 30 and 31 in meshing engagement. Stub shaft 32 extends through the wall of the frame 10 and is journalled for rotation therein. A hand crank 33 is secured in the shaft 32 and upon rotation thereof is adapted to turn the gears 31, 30 and the shaft 32 to rotate the table 16. It should be understood that the construction described to this point is conventional.

A plurality of cam pins 34 are imbedded in the clamping table 16 so that the pins 34 extend upwardly therefrom. Each of the pins 34 are sloped rearwardly with relation to the direction of rotation of said table 16. The pins 34 are curved slightly to form a cam surface. An arm 35 is pivoted by pivot 36 to the arm 18, carrying the clamping head 17. A spring support 37 is secured to the arm 18 and has a hook 38 formed in the upper end thereof. The arm 35 has an aperture 39 formed on one side of the pivot 36 and a series of notches 40 formed on the underside of the arm 35 along the side opposite the aperture 39. A spring 41 extends from the hook 38 to the aperture 39 and tends to bias the arm 35 in a direct away from the table 16. A second spring 42 extends from the hook 38 to one of the notches 40 and tends to bias the arm 35 oppositely to the spring 41, the spring 42 being substantially stronger than the spring 41. The end of the arm 35 carrying the aperture 39 is formed as an elongated head 43 which is tapered along its lower edge as at 44 and covered with a rubber head element 45. The head 43 is also provided with a cam pin engaging surface 46, which is not covered with rubber.

In the use and operation of the invention as disclosed in Figures 1 and 2, the cutter 27 is brought into engagement with the lens 15 and a score line is formed on the lens 15 by rotation of the handle 33 in the same manner as taught by the Lockhart patent. After the score line is formed, the cutter 27 is moved out of engagement with the lens 15 and the spring 42 has its lower end engaged in one of the notches 40 so as to bias the head 43 on the arm 35 toward the lens 15. The spring 42 is engaged in the proper notch 40 to apply the correct spring tension on the head 43 for the particular type of lens 15 clamped in the machine. After the tension has been adjusted, as above described, the hand crank 33 is rotated, thus rotating the table 16 along with the cam pins 34. The surface 46 being in engagement with the cam pins 34, is caused to rise upwardly in turn by each of the cam pins 34. As the cam pin 34 passes under the hammer 43, the hammer 43 will be permitted to abruptly drop, striking the lens 15. As the handle 33 is rotated, hammer head 43 will be caused to drop onto the lens 15 as often as a cam pin 34 passes therebeneath. It can thus be seen that the lens 15 will be tapped, with a constant hammering pressure being exerted which will prevent breakage of the lens 15 due to improper chipping by hand methods.

When the chipping operation has been completed, the head 43 is moved to inoperative position by sliding the lower end of the spring 42 closely adjacent to the pivot 36, as illustrated in Figure 1. It should be understood that a specific mechanism for positively moving the lower end of the spring 42, or other equivalent structures for maintaining the arm 35 in inoperative position when out of use, may be substituted for the structure illustrated herein.

Referring now to Figure 3, a modified form of the invention is disclosed wherein a table 16' is substituted for the table 16 in the machine disclosed in Figure 1. The table 16' is provided with radially extending cam pins 34'. An arm 35' is substituted for the arm 35 and is constructed the same as the arm 35 except that the spring aperture 39 is omitted from the arm 35'. A cam arm 47 is pivoted to the arm 35' at 48 and is provided with a series of spring apertures 49 along the upper portion thereof. The lower end 50 of the cam arm 47 is sloped at 51 to form a cam surface 52 to engage the cam pins 34', whereby upon rotation of the table 16' the cam pins 34' will act on the cam surface 52 to lift the cam arm 47 and hence the arm 35'. The movement of the cam pins 34' will then release the cam arm 47 and permit the arm 35' to fall so that the hammer head portion 43' thereof will strike the edge of the lens 15' to break the unwanted portion therefrom.

It should be noted that the lens 15' can be reached easier in this form of the invention in clamping and unclamping the lens 15' in the machine.

The provision of the spring 41 receiving apertures 49 in the cam arm 47 permits adjustment of the tension on the spring 41 to obtain the correct balance for the spring 42.

Having thus described the preferred embodiments of the invention, it should be understood that numerous additional modifications and adaptations may be resorted to without departing from the scope of the appended claims.

What is claimed is:

1. In a lens cutting machine of the type including a rotary clamping table, means for scoring a lens and means for rotating the table, a lens chipping attachment comprising: a plurality of cam pins projecting from said table, a hammer, means pivoting said hammer to said cutting machine, means resiliently biasing said hammer toward the lens, and means on said hammer engaging said cam pins whereby upon rotation of said cutting table and said cams, said hammer is caused to move outwardly away from said lens and then released to move toward said lens sharply thereby tapping the lens to remove the unwanted glass.

2. A device as claimed in claim 1, wherein said hammer is formed with a resiliently coated head for striking said lens.

3. A device as claimed in claim 1, wherein means are provided for maintaining said hammer out of engagement with said cams when it is desired to move the hammer to inoperative position.

4. A device as claimed in claim 1, wherein said cam pins are mounted in the top surface of said table and said cam pins are sloped and curved slightly rearwardly to provide means whereby said hammer may be dropped on said lens quite sharply.

5. A device as claimed in claim 1, wherein said cam pins project radially from the side edge of said table.

References Cited in the file of this patent

UNITED STATES PATENTS

| | | |
|---|---|---|
| 2,051,698 | Gaskell | Aug. 18, 1936 |
| 2,259,765 | Morris | Oct. 12, 1941 |